United States Patent Office 3,634,539
Patented Jan. 11, 1972

3,634,539
OLEFIN DISPROPORTIONATION
Henk J. Alkema, Dirk Medema, and Freddy Wattimena, Amsterdam, Netherlands, assignors to Shell Oil Company, New York, N.Y.
No Drawing. Filed June 2, 1969, Ser. No. 829,730
Claims priority, application Great Britain, June 10, 1968, 27,445/68
Int. Cl. C07c *3/62, 11/02, 13/00*
U.S. Cl. 260—683 D    8 Claims

ABSTRACT OF THE DISCLOSURE

Olefins are disproportionated with a catalyst composition produced by contacting a molybdenum or tungsten halide and an inorganic oxide solid.

BACKGROUND OF THE INVENTION

Reactions of olefinic molecules in the presence of metal-containing catalysts to produce other olefinic molecules are known in the art, such as "disproportionation." A typical olefin disproportionation process is illustrated by U.S. 3,261,879, issued July 19, 1966, to Banks, wherein two similar molecules of an olefin react in the presence of certain catalysts to produce one olefin of a higher carbon number and one olefin of a lower carbon number. For example, propylene disproportionates by the process of U.S. 3,261,879 to produce ethylene and butylenes.

A variation of this disproportionation process, which might be termed "reverse disproportionation" is illustrated by the Netherlands patent application 6514985 of British Petroleum Company, Limited, published May 20, 1966, wherein, in one modification, molecules of two dissimilar olefins are reacted to form two molecules of a single olefin product, e.g., ethylene and 2-butene react to form propylene.

Another variation of the process, being conveniently termed "ring opening disproportionation" to distinguish it from other variations, is disclosed by Netherlands patent application 6702703 of Phillips Petroleum Company, published Aug. 24, 1967, wherein a cyclic olefin and an acyclic olefin react to form a single product molecule. For example, ethylene reacts with cyclopentene by "ring opening disproportionation" to produce 1,6-heptadiene.

The term "disproportionation process" as herein employed is meant to inclued all variations of disproportionation reactions.

A variety of catalysts have been employed for conducting disproportionation reactions. One type of disproportionation catalyst comprises homogeneous catalyst compositions produced by contacting a tungsten salt and a hydrocarbon soluble organoaluminum compound. Although such actalyst compositions possess a high level of catalytic activity in disproportionation reactions, the organoaluminum compound precursors are expensive and present operational difficulties during production, storage and utilization in catalyst preparation. It would be of advantage to produce active disproportionation catalysts without the use of expensive aluminum compounds as catalyst precursors, particularly heterogeneous disproportionation catalysts, i.e., catalysts which are substantially insoluble in the reaction mixture since heterogeneous catalysts generally exhibit a number of operational advantages for large-scale industrial operations. For example, heterogeneous catalyst systems do not require elaborate means for separation of catalyst composition and reaction products due to the insolubility of the catalyst composition in the reaction mixture.

SUMMARY OF THE INVENTION

It has now been found that an improved process of disproportionating olefins is obtained through the use of a catalyst composition produced by contacting a molybdenum or tungsten halide salt and an inorganic oxide solid. The catalyst composition is catalytically active for disproportionating olefins at room temperature and is a heterogeneous composition, i.e., substantially insoluble in the disproportionation reaction mixture.

DESCRIPTION OF PREFERRED EMBODIMENTS

The olefinic reactants.—The process of the invention comprises the contacting of two olefinic reactants, which may be the same olefin or different olefins, in the presence of disproportionation catalyst compositions comprising tungsten or molybdenum halide salts and an inorganic oxide solid. The olefinic reactant comprises a hydrocarbon having at least one ethylenic linkage. The olefinic reactant is acyclic, monocyclic or polycyclic of up to four rings, preferably of two rings, and is a monoolefin or is a polyolefinic reactant preferably of up to three non-conjugated carbon-carbon double bonds. When the olefinic reactant is cyclic, at least one ethylenic linkage is a portion of a carbocyclic ring of at least five carbon atoms.

A class of suitable acyclic olefinic reactants is represented by the Formula I $$RCH = CHR' \qquad (I)$$

wherein R and R' independently are hydrogen or alkyl of up to 18 carbon atoms with the total number of carbon atoms of the acyclic olefin, which total is herein termed $n$, being no more than 30.

Illustrative of acyclic olefinic reactants represented by Formula I are propylene, 1-butene, 2-butene, 2-pentene, 3-hexene, 4-methyl-1-heptene, 2-decene, 6-dodecene, 3-tetradecene and 10-eicosene. In general, the preferred acyclic olefins are olefins of up to 20 carbon atoms, more preferably of up to 10 carbon atoms, and especially preferred are linear acyclic internal monoolefins, i.e., those olefins wherein both R and R' groups are n-alkyl.

A class of suitable cyclic olefinic reactants is represented by Formula II

(II)

wherein A is a divalent hydrocarbon moiety of from three to ten carbons and of up to three ethylenic double bonds which are portions of carbocyclic rings and is selected so that the carbon atoms depicted in the Formula II are members of a carbocyclic ring of at least five carbon atoms. The total number of carbon atoms of the cyclic olefinic reactant of Formula II which total is herein termed "$m$," is therefore from five to twelve.

Illustrative monocyclic olefinic reactants of Formula II include cyclopentene, cycloheptene, cyclooctene, cyclodecene, 1,5-cyclooctadiene, 1,6-cyclodedadiene and 1,5,9-cyclododetriene, whereas illustrative polycyclic olefinic reactants are illustrated by bicyclo(2.2.2)-hepta-2,5-diene, bicyclo(2.2.1)hept-2-ene, tricyclo(4.2.1.0$^{2,5}$)non-7-ene, tricyclo(5.2.1.0$^{2,6}$)deca-3,8-diene, bicyclo(2.2.2)oct-2-ene, bicyclo(2.2.2)octa-2,5-diene, bicyclo(3.3.0)oct-2-ene, dicyclopentadiene(3a,4,7,7a-tetrahydro-4,7-methanoindene), and quadricyclo(2.2.1.2$^{2,6}$.0$^{3,5}$)non-8-ene. Particularly satisfactory results are obtained when the cyclic olefinic reactant is a monocyclic or a bicyclic olefinic reactant of up to two ethylenic linkages and most preferred are the monocyclic, monoolefinic reactants of from five to eight carbon atoms.

Another class of suitable olefinic reactants are polyolefinic compounds containing two or more non-conjugated double bonds. Illustrative polyolefins are 1,4-polybutadiene, 1,4-polyisoprene and a copolymer of styrene and butadiene.

When two different olefinic reactants are employed in the disproportionation process, the molar ratio of one olefinic reactant to the other olefinic reactant is not critical, and up to a 20-fold excess, preferably up to a 10-fold excess of one olefinic reactant can be employed.

Catalyst composition.—The catalyst composition employed for the olefin disproportionation process of the invention comprises the product of contacting a molybdenum halide or a tungsten halide and an inorganic oxide solid.

Suitable molybdenum and tungsten halides are those wherein the halogen is of atomic number from 9 to 53 inclusive, e.g., fluorine, chlorine, bromine and iodine. Illustrative molybdenum halides are molybdenum tetrabromide, molybdenum pentachloride and molybdenum hexafluoride and illustrative tungsten halides are tungsten tetraiodide, tungsten pentabromide and tungsten hexachloride. The halide of molybdenum or tungsten is preferably combined with the inorganic oxide solid in a high positive oxidation state, e.g., molybdenum pentahalide or tungsten hexahalide. Particularly preferred for preparation of the catalyst composition are molybdenum and tungsten chlorides, especially molybdenum pentachloride and tungsten hexachloride.

The inorganic oxide solid comprises an inorganic oxide support containing a major proportion of silica, titania or alumina. Such materials include synthetic materials as well as acid-treated clays or the crystalline aluminosilicates known in the art as molecular sieves. Synthetic inorganic oxides are preferred over naturally occurring materials or molecular sieves and exemplary synthetic inoganic oxides include silica, alumina, silica-alumina, silica-magnesia, boria-alumina, silica-alumina-zirconia and silica-titania-zirconia. Preferred inorganic oxides are those containing a major proportion of alumina and particularly preferred as inorganic oxides are alumina and silica-alumina.

Suitable inorganic oxides are characterized by having a relatively large surface area in relation to their mass. Numerically, surface area will be expressed as square meters per gram ($m.^2/g.$). Generally, the inorganic oxide has a surface area of at least 10 $m.^2/g.$, preferably the surface area is from 25 $m.^2/g.$ to 800 $m.^2/g.$ and more preferably the surface area is from 50 $m.^2/g.$ to 700 $m.^2/g.$ The amount of molybdenum or tungsten halide on the inorganic oxide solid can be varied within wide limits. In general, amounts of molybdenum or tungsten halide of at least 0.001 millimole, per gram of inorganic oxide are satisfactory, but preferably the amount of molybdenum or tungsten halide is at least 0.01 millimole and more preferably at least 0.02 millimole, per gram of inorganic oxide. The upper limit of the molybdenum or tungsten halide present per gram of inorganic oxide is always the maximum amount of halide salt which can be adsorbed on the inorganic oxide.

The catalyst composition can be prepared in several ways. One mode of preparation comprises impregnating the solid inorganic oxide with a solution of the halide salt to be deposited in an inert organic solvent, removing the excess of impregnating solution (if any) e.g., by decantation and finally removing the solvent from the impregnated inorganic oxide e.g., by means of a stream of an inert gas such as nitrogen, if desired, this removal of solvent may be carried out at a somewhat elevated temperature (e.g., between 50° and 150° C.), which may be of advantage if the organic solvent has a relatively high boiling point. The catalyst so obtained is ready for use, and needs no calcining, although a calcining operation is not excluded. It is to be understood that calcining, if any, is to be carried out at temeperatures below the decomposition temperature of the halide salt adsorbed on the inorganic oxide solid.

The catalyst composition can also be prepared by addition of a solution of the halide salt to be adsorbed in an inert solvent to a fluidized bed of the inorganic oxide. This bed can be kept in the fluidized state by means of a stream of inert gas, such as nitrogen. The inert solvent is removed during the preparation of the catalyst. If desired, this preparation may also be carried out at a somewhat elevated temperature, in order to achieve a complete or nearly complete removal of the inert solvent.

It will be appreciated that the methods for the preparation of the catalyst given are only mentioned as examples; many other methods can be used in order to prepare a supported catalyst suitable for the disproportionation of olefinically unsaturated compounds according to the invention.

Reaction conditions.—The disproportionation of the olefinically unsaturated compounds can with advantage be carried out at temperatures between —10 and 350° C. Temperatures between 10° C. and 200° C. are very suitable, while temperatures between 20° C. and 75° C. are preferred. One of the advantages of the present disproportionation process is that it can be carried out at room temperature or slightly above, so that no heating equipment is required.

The disproportionation reaction according to the invention can be carried out by contacting the olefins to be disproportioned with the catalyst in the liquid phase or the gas phase, depending on structure and molecular weight of the olefins, temperature and pressure.

The pressure during the disproportionation reaction may vary between wide limits. Pressures between 0.1 and 500 atm. are suitable; preferred pressures are between 0.5 and 250 atm. If possible, the process should be operated at a pressure which is atmospheric or nearly atmospheric, so that no vacuum or pressure apparatus is required.

If the reaction is carried out in the liquid phase, solvents or diluents for the reactants may be used. Aliphatic saturated hydrocarbons (e.g., pentane, hexane, cyclohexane, dodecane) and aromatic hydrocarbons such as benzene and toluene are suitable. If the reaction is carried out in the gaseous phase, diluents such as aliphatic hydrocarbons (e.g., methane, ethane) and/or inert gases (e.g., nitrogen, carbon dioxide) may be present. Preferably the disproportionation reaction is effected in the substantial absence of reactive materials such as water and oxygen.

The length of time during which the olefinically unsaturated compounds to be disproportionated are contacted with the catalyst is not very critical, and may conveniently vary between 5 seconds and 24 hours, although longer and shorter contact times are not excluded. The contact time needed to obtain a reasonable yield of disproportionated products depends on several factors such as the activity of the catalyst, temperature, pressure and structure of the olefinically unsaturated compounds to be disproportionated.

The process of the invention is effected batchwise or continuously, with fixed catalyst beds, slurried catalysts, fluidized beds or by using any other conventional contacting technique. The solid disproportionation catalysts are applied in any appropriate form, for example as powders, flakes, pellets, spheres or extrudates.

The products.—According to the process of the invention two olefinic reactants are disproportionated to a product comprising olefin(s) having a total number of carbon atoms equal to the sum of the carbon atoms of the two olefinic reactants and having a number of ethylenic linkages equal to the sum of the ethylenic double bonds of the reactants.

One variation of the process comprises the disproportionation of two molecules of the same olefinic reactant. The reaction of two molecules of an acyclic olefin of Formula I generally produces one olefin of a higher carbon number and one olefin of a lower carbon number as depicted in Equation 1

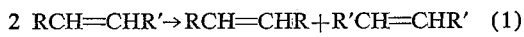

wherein R and R' have the previously stated significance. If R and R' represent identical groups, it is appreciated that the disproportionation reaction will not cause any skeletal changes as the products RCH=CHR and R'CH=CHR' will be equivalent to R'CH=CHR. By way of specific illustration, the reaction of two molecules of propylene produces ethylene and 2-butene. However, the reaction of two molecules of 2-butene produces two molecules of 2-butene. The reaction of two molecules of cyclic olefinic reactant of Formula II, however, produces a single cyclic olefin produced as depicted in Equation 2

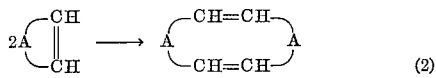

By way of specific illustration, the reaction of two molecules of cyclooctene produces 1,9-cyclohexadecadiene.

Another variation of the process comprises the disproportionation of two different acyclic olefinic reactants. By way of specific illustration, the reaction of 2-butene and 3-hexene produces two molecules of 2-pentene and the reaction of 2-butene with 1,4-polybutadiene produces two molecules of 1,4-polybutadiene having a molecular weight which is less than the molecular weight of the starting 1,4-polybutadiene.

Still another variation of the process is "ring-opening" disproportionation wherein an acyclic olefinic reactant represented by Formula I is contacted with a cyclic olefinic reactant represented by Formula II. The product of "ring-opening" is a single olefinic compound with one less carbocyclic ring than the cyclic olefinic reactant of Formula II. In terms of the Formulas I and II, the product is represented by Formula III

wherein R, R' and A have the previously stated significance. By way of specific illustration, from reaction of 2-butene and cyclopentene is produced 2,7-nonadiene. Other typical products include 2,8-decadiene produced by reaction of cyclohexene and 2-butene, 3,8-undecadiene produced from 3-hexene and cyclopentene, 1,5,9-decatriene produced by reaction of ethylene and 1,5-cyclooctadiene, and 1,4-divinylcyclohexane from ethylene and bicyclo(2.2.2)oct-2-ene.

In "ring-opening" disproportionation, the cyclic olefinic reactant is preferably a monocyclic or a bicyclic olefinic reactant of up to two ethylenic linkages and most preferably is a monocyclic, monoolefinic reactant of from five to eight carbon atoms, and the acyclic olefinic reactant is preferably an internal olefin which is symmetrical about the double bond, i.e., those olefins wherein both R and R' groups are alkyl and R=R'. The molar ratio of cyclic olefinic reactant to the acyclic olefin in ring-opening disproportionation is not critical, although it is frequently useful to employ a molar excess of the acyclic olefin. Molar ratios of acyclic olefin to cyclic olefinic reactant from about 1:1 to about 20:1 are satisfactory with molar ratios from about 1:1 to about 10:1 being preferred.

It is appreciated that an olefinic product produced by any variation of the disproportionation process can undergo further disproportionation with another olefin present in the reaction mixture. For example, 1,6-heptadiene produced from reaction of cyclopentene and ethylene can react with another molecule of cyclopentene to produce 1,6,11-dodecatriene, and 1,9-cyclohexadecadiene produced from reaction of two molecules of cyclooctene can react with additional molecules of cyclooctene to give a high molecular weight monocyclic polyene.

The olefinic products, for the most part, have established utility as precursors of polymers, e.g., as the third component of ethylenepropylene terpolymers useful as synthetic elastomers. Cleavage of the ethylenic bonds of polyolefinic products as by ozonization produces di- or polycarboxylic acids which are reacted with diamines, e.g., hexamethylenediamine, to form nylons which are useful in synthetic fibers. The olefinic products are converted to secondary and tertiary alcohols as by sulfuric acid-catalyzed hydration. Alternatively, the olefinic products are converted by conventional "Oxo" processes to aldehydes which are hydrogenated with conventional catalysts to the corresponding alcohols. The $C_{12}$–$C_{20}$ alcohols thereby produced are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride.

To further illustrate the improved process of the invention and the novel catalyst composition therefor, the following examples are provided.

EXAMPLE I

Several catalysts consisting of tungsten hexachloride on a carrier material were prepared as follows.

The carrier material was calcined in a fluidized bed with nitrogen at a temperature of 500° C. for two hours. After cooling in the absence of air two grams of the carrier were treated at room temperature in a round-bottomed flask under nitrogen with a solution of 0.04 mmole tungsten hexachloride in 20 ml. toluene. Within a few seconds the blue color of the solution disappeared completely and the supernatant fluid became free of tungsten hexachloride, owing to the adsorption of the tungsten hexachloride on the carrier. The toluene was subsequently removed from the round-bottomed flask by stripping with nitrogen, first at room temperature and finally at 120° C.

The catalysts so obtained, containing 0.04 mmole tungsten hexachloride, were tested by contacting them in a stoppered vessel at room temperature under nitrogen with 200 mmole of a mixture of 54% cis- and 46% trans-2-pentene. The results are given as mol percentage of 2-pentene converted to 2-butene and 3-hexene after the contact times recorded. The butene-2 and hexene-3 were obtained from the reaction mixture by distillation or preparative gas chromatography.

Results:

(a) Carrier material: silicon dioxide, surface area 629 m.²/g. Conversion 0.5% after 8 hours, 1.6% after 22 hours.

(b) Carrier material: titanium dioxide, surface area 70 m.²/g. Conversion 1.2% after 1 hour, 1.9% after 2 hours.

(c) Carrier material: aluminium oxide (γ-alumina), surface area 203 m.²/g. Conversion 1.5% after 2 hours, 18% after 24 hours.

(d) Carrier material: silicon dioxide-aluminum oxide (silica-alumina) containing 25% w. $Al_2O_3$, surface area 554 m.²/g. Conversion 1% after 0.16 hour, 6% after 1.2 hours, 9% after 2 hours.

EXAMPLE II

A disproportionation catalyst was prepared by saturating 2 g. of a silica-alumina (containing 25% w. $Al_2O_3$) with a surface area of 554 m.²/g. (which was precalcined in a fluidized bed with nitrogen at a temperature of 500° C. for two hours) with tungsten hexachloride, by addition, at room temperature and in the absence of air of such an amount of a solution containing 0.02 mmole of tungsten hexachloride per 10 ml. toluene that the supernatant liquid just remained blue. Two millimole of tungsten hexachloride were adsorbed. The toluene was removed in the way described in Example I. The catalyst so prepared was contacted with 200 millimole of a mixture of 54% cis- and 46% trans-2-pentene at room temperature in a stoppered vessel in a nitrogen atmosphere. After 15 minutes 36% of the 2-pentene had disproportionated to 2-butene and 3-hexene, which were recovered by distillation.

EXAMPLE III

A catalyst was prepared by the procedure described in Example II and contacted at room temperature with 200 mmole 1-pentene. After 22 hours 82.3% of the 1-pentene had been converted. A mixture of olefins with two to eight carbon atoms was obtained, wherefrom the olefins were recovered by gas-chromatography. In the products obtained 2-butene and 3-hexene were found in an amount of 45% on converted 1-pentene, indicating that part of the 1-pentene had been isomerized to 2-pentene, which had subsequently been disproportionated.

EXAMPLE IV

A catalyst is prepared by the procedure described in Example II and contacted with an equimolar mixture of 10-docosene and 2-butene at room temperature in a stoppered vessel under an atmosphere of nitrogen. Gas chromatographic analysis of the reaction mixture shows an olefinic product mixture comprising substantial amounts of 2-tetradecene.

EXAMPLE V

A catalyst is prepared and contacted with a mixture of bicyclo(2.2.1)-hept-2-ene and 2-butene in a stoppered vessel by a procedure identical to that of Example II. Gas chromatographic analysis of the reaction mixture shows a good yield of 1,3-dipropenylcyclopentane.

EXAMPLE IV

A disproportionation catalyst is prepared by contacting a silica-alumina support with a solution of molybdenum pentachloride in toluene by a procedure similar to that of Example I. The resulting catalyst was contacted with an isopentane solution of 2-butene and polyisoprene having a cis-1,4-content of 94% and a molecular weight of about 100,000 at a temperature of 25° C. in a stoppered vessel under an atmosphere of nitrogen. The reaction product comprises a polyisoprene of lower-molecular weight than the starting polymer.

We claim as our invention:

1. A process consisting essentially of disproportionating two olefinic reactants to a product comprising olefin(s) having a total number of carbon atoms equal to the sum of the carbon atoms of the two olefinic reactants and having a number of ethylenic linkages equal to the sum of the ethylenic double bonds of the two olefinic reactants by contacting the two olefinic reactants in the presence of a catalyst composition produced by intimately contacting a molybdenum or tungsten halide salt, wherein the halogen is chlorine, bromine or iodine, with an inorganic oxide solid having a surface area of at least 10 m.$^2$/g., said catalyst composition containing at least 0.001 millimole of molybdenum or tungsten halide per gram of inorganic oxide solid, at a temperature of between 10° C. and 200° C., and recovering said product.

2. The process of claim 1 wherein the catalyst composition contains at least 0.01 millimole of molybdenum or tungsten halide per gram of inorganic oxide solid.

3. The process of claim 2 wherein the inorganic oxide solid contains a major proportion of alumina and has a surface area of from 25 m.$^2$/g. to 800 m.$^2$/g.

4. The process of claim 2 wherein the two olefinic reactants are selected from acyclic hydrocarbon monoolefin of up to 30 carbon atoms and cyclic hydrocarbon olefin of up to 4 carbocyclic rings, of up to 12 carbon atoms and up to 3 ethylenic linkages, the carbon atoms of at least one ethylenic linkage being members of a carbocyclic ring of at least 5 carbon atoms.

5. The process of claim 4 wherein the inorganic oxide solid is silica-alumina.

6. The process of claim 4 wherein the inorganic oxide solid is alumina.

7. The process of claim 4 wherein the molybdenum halide is molybdenum pentachloride.

8. The process of claim 4 wherein the tungsten halide is tungsten hexachloride.

References Cited

UNITED STATES PATENTS

| | | | |
|---|---|---|---|
| 1,923,583 | 8/1933 | Pungs et al. | 260—683.15 |
| 2,421,950 | 6/1947 | Linn et al. | 260—683.15 |
| 3,109,041 | 10/1963 | Child et al. | 260—683.15 |
| 3,261,879 | 7/1966 | Banks | 260—683 |
| 3,424,811 | 1/1969 | Mango | 260—680 |
| 3,457,320 | 7/1969 | Stapp et al. | 260—683 |

DELBERT E. GANTZ, Primary Examiner

C. E. SPRESSER, JR., Assistant Examiner

U.S. Cl. X.R.

260—94.7 D, 666 A, 677 R, 680 R, 683.2